(12) United States Patent
Kokura et al.

(10) Patent No.: US 8,301,869 B2
(45) Date of Patent: Oct. 30, 2012

(54) PROGRAMMABLE CONTROLLER FOR EXECUTING A PLURALITY OF INDEPENDENT SEQUENCE PROGRAMS IN PARALLEL

(75) Inventors: Masuo Kokura, Minamitsuru-gun (JP);
Yasushi Nomoto, Minamitsuru-gun (JP);
Motoyoshi Miyachi, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/030,431

(22) Filed: Feb. 18, 2011

(65) Prior Publication Data

US 2011/0208952 A1    Aug. 25, 2011

(30) Foreign Application Priority Data

Feb. 25, 2010   (JP) ................. 2010-040996

(51) Int. Cl.
G06F 7/38      (2006.01)
G06F 9/00      (2006.01)
G06F 9/44      (2006.01)
G06F 15/00     (2006.01)

(52) U.S. Cl. ...................................... 712/221

(58) Field of Classification Search ............... None
See application file for complete search history.

(56) References Cited

U.S. PATENT DOCUMENTS

| 5,748,934 | A | * | 5/1998 | Lesartre et al. | 712/216 |
| 5,958,043 | A | * | 9/1999 | Motomura | 712/216 |
| 6,901,504 | B2 | * | 5/2005 | Luick | 712/218 |
| 7,984,272 | B2 | * | 7/2011 | Luick | 712/218 |

FOREIGN PATENT DOCUMENTS

| EP | 1 870 792 A1 | 12/2007 |
| JP | 2009-116445 | 5/2009 |
| WO | WO 2010/077751 A2 | 7/2010 |

* cited by examiner

*Primary Examiner* — Corey S Faherty
(74) *Attorney, Agent, or Firm* — Drinker Biddle & Reath LLP

(57) ABSTRACT

A programmable controller which executes a plurality of independent sequence programs in parallel is provided with an ASIC, including a plurality of arithmetic-logic units and a plurality of arbitration circuits, and MPUs as many as the arbitration circuits. The entire execution time of the programmable controller is shortened by changing combinations (groups of arithmetic-logic units) of the MPUs (and the arbitration circuits as many as the MPUs) and the arithmetic-logic units, based on the ratios of MPU execution instructions and ASIC execution instructions included in those instructions which constitute the programs to be executed in parallel.

6 Claims, 16 Drawing Sheets

PROGRAMMABLE CONTROLLER FOR EXECUTING A PLURALITY OF INDEPENDENT SEQUENCE PROGRAMS IN PARALLEL

RELATED APPLICATION DATA

This application claims priority under 35 U.S.C. §119 and/or §365 to Japanese Application No. 2010-040996 filed Feb. 25, 2010, the entire contents of which are incorporated herein by reference.

BACKGROUND OF THE INVENTION

1. Field of the Invention

The present invention relates to a programmable controller configured to execute a plurality of independent sequence programs in parallel.

2. Description of the Related Art

In general, in a programmable controller configured to perform sequence control, an execution of sequence programs, that is, an arithmetic and logical operation processing, is performed by a micro-processing unit (MPU) or application-specific integrated circuit (ASIC). The MPU or ASIC is alternatively used for the processing depending on instructions that constitute the sequence programs. The MPU is based on a single LSI that combines functions of a CPU, while the ASIC is an integrated circuit customized for a particular use.

Japanese Patent Application Laid-Open No. 2009-116445 discloses the following techniques (A) and (B) in which a plurality of independent sequence programs are executed by such a single programmable controller.

(A) Hardware comprising a single MPU 10, a single memory 20, and a single ASIC 30, as shown in FIG. 1. N number of programs (1) to (n) are executed on a time-division basis by a single arithmetic-logic unit in the ASIC 30, as shown in FIG. 2. In the programmable controller constructed in this manner, the individual programs are processed on a time-series basis by the single arithmetic-logic unit, so that processing of all the programs takes a long time, as shown in FIG. 2.

(B) Hardware comprising a single MPU 10, a single memory 20, and a single ASIC 30. As shown in FIG. 3, the ASIC 30 includes n number of arithmetic-logic units (1) to (n) and a single arbitration circuit 38 and can execute n number of programs (1) to (n) in parallel. As shown in FIG. 4, the time required for the processing of the programs (1) to (n) is an execution time t for the program (program (1) in the example shown in FIG. 4) that requires the longest processing time.

According to the technique (A), as shown in FIG. 2, there is a problem of the long total processing time.

According to the technique (B), as shown in FIG. 3, on the other hand, a plurality of sequence programs are executed by the arithmetic-logic units in the ASIC 30 and the single MPU 10. Therefore, if the ratio of the instructions executed by the MPU to the instructions that constitute each program is high, the possibility of a plurality of programs simultaneously requesting the MPU to execute the instructions increases. Consequently, a problem occurs that the programs are stopped to wait for the execution of the MPU instructions.

FIG. 5 is a diagram illustrating a problem of the prior art techniques and shows how the programs (1) to (3) are processed in parallel by the programmable controller of FIG. 5. Reference numeral 100 denotes the execution instruction time of each MPU, and reference numeral 112 denotes that of each ASIC. Reference numerals 114 and 116 denote program stops.

Since the MPU 10 is singly used, its processing of the program (2) is started on completion of its processing of the program (1). Further, the MPU 10 starts processing of the program (3) on completion of the processing of the program (2). Thus, the singleness of the MPU 10 causes a problem that the MPU execution instructions of a plurality of programs cannot be simultaneously processed so that the programs are stopped.

SUMMARY OF THE INVENTION

Accordingly, in consideration of the above-described problems of the prior art techniques, the object of the present invention is to provide a programmable controller configured to execute a plurality of independent sequence programs in parallel, in which the ratio of instructions executed by an MPU to all instructions that constitute each program is so high that the time during which the programs are stopped to wait for the execution of the MPU execution instructions can be shortened even in the case where a plurality of programs simultaneously request the MPU to execute the instructions.

A programmable controller according to the present invention which executes a plurality of independent sequence programs in parallel comprises: a plurality of arithmetic-logic units configured to execute predetermined first instructions in the sequence programs by hardware; a plurality of MPUs configured to execute second instructions in the independent sequence programs, from among the plurality of independent sequence programs executed in parallel, which can not be executed by the arithmetic-logic units; first transfer means configured to transfer information on at least one of the second instructions generated in the arithmetic-logic units to the MPUs in the order of generation of the instructions; and second transfer means configured to transfer information on results of execution of the second instructions executed by the MPUs to the arithmetic-logic units which are sources of generation of the information on the second instructions. The plurality of arithmetic-logic units are divided into groups as many as the MPUs, each of the groups including at least one arithmetic-logic unit, and at least one of the groups includes at least two arithmetic-logic units, and the first and second transfer means and the MPUs are arranged in association with the group including the at least two arithmetic-logic units.

The programmable controller may further comprise selection means for selecting, when grouping the arithmetic-logic units into a plurality of groups, respective groups to which individual arithmetic-logic unit is caused to belong.

The selection means may include a register configured to store data which specifies the group to which each of the arithmetic-logic units is caused to belong, and a selection circuit which associates each of the arithmetic-logic units with the first and second transfer means and the MPU corresponding to the group to which the arithmetic-logic unit belongs in accordance with the data stored in the register.

The data which specifies the group to which each of the arithmetic-logic units belongs may be data on a combination for the shortest execution time for the plurality of individual sequence programs, based on a simulation performed by arbitrarily dividing the sequence programs into the groups.

In case where a group to which only one arithmetic-logic unit belongs is formed, the only one arithmetic-logic unit may be connected with alternative transfer means, other than the first and second transfer means, which is configured to directly transfer the information on the second instruction generated in the arithmetic-logic unit to the corresponding MPU.

A single MPU comprising a plurality of cores for each chip may be used in place of the plurality of MPUs configured to execute the second instructions.

According to the present invention, there may be provided a programmable controller configured to execute a plurality of independent sequence programs in parallel, in which the ratio of instructions executed by an MPU to all instructions that constitute each program is so high that the time during which the programs are stopped to wait for the execution of the MPU execution instructions can be shortened even in the case where a plurality of programs simultaneously request the MPU to execute the instructions.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
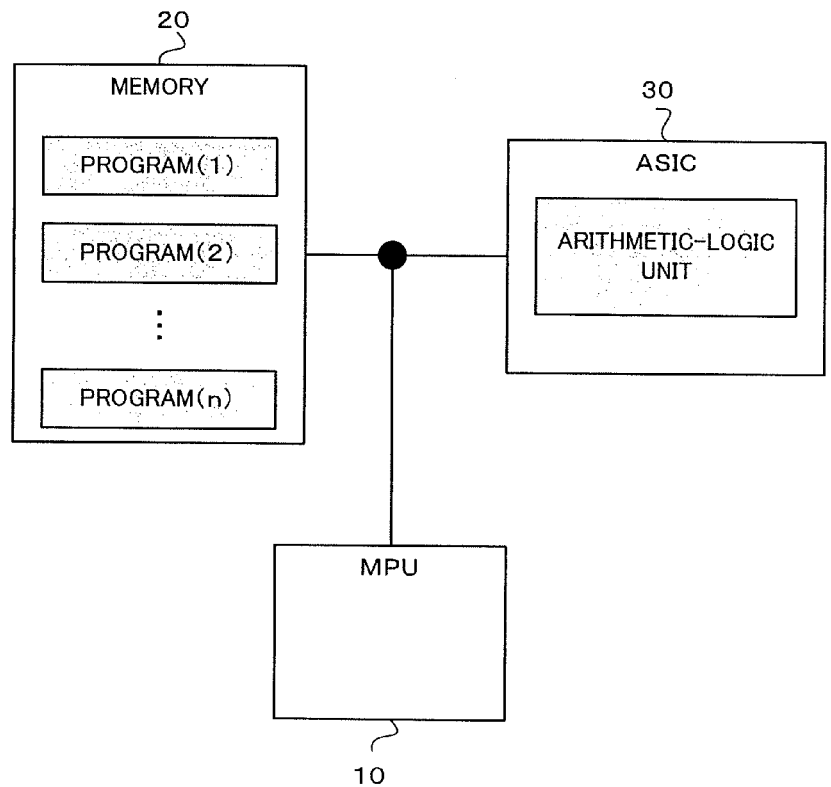
FIG. 1 is a schematic block diagram illustrating an example of a prior art programmable controller mounted with hardware comprising a single MPU and an ASIC including a single arithmetic-logic unit.
Figure 2:
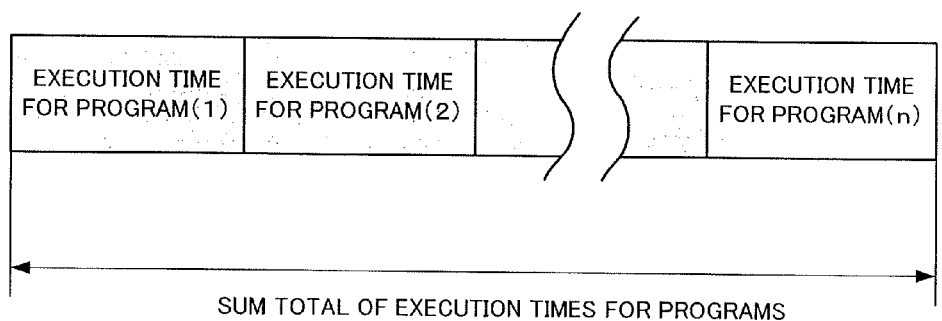
FIG. 2 is a diagram illustrating the time required to finish execution of all of a plurality of programs on a time-division basis by the programmable controller of FIG. 1.

In the description of sequence programs to follow, an instruction executable in a circuit (hereinafter referred to as an arithmetic-logic unit) for executing arithmetic and logical operations will be referred to as a "first instruction", and an instruction that is not executable in the arithmetic-logic unit but is processed by an MPU will be referred to as a "second instruction".

The arithmetic-logic unit comprises MPU instruction execution request means and restart means. The MPU instruction execution request means outputs an MPU instruction execution request signal when the second instruction is issued and remains in a stopped state until the execution of the second instruction is completed by the MPU after the MPU instruction execution request signal is output. The restart means restarts the program execution on receipt of a signal indicative of the completion of the execution of the second instruction by the MPU.

"First transfer means" comprises reception means, storage means, and MPU execution start means. The reception means sequentially receives the MPU instruction execution request signal when the second instruction is issued. The storage means sequentially stores the ID number of the arithmetic-logic unit in which the second instruction is issued and the program address of the second instruction. The MPU execution start means sequentially outputs an MPU instruction execution start signal, with which the MPU executes the second instruction based on the program address stored in the storage means, from the reception means to the MPU.

"Second transfer means" comprises MPU execution completion notification means, which outputs an MPU execution completion notification signal and an execution result to the arithmetic-logic unit having the ID number corresponding to the second instruction every time the execution of the second instruction is completed by the MPU.

The first and second transfer means are based on the prior art technique described in Japanese Patent Application Laid-Open No. 2009-116445.

A first embodiment of a programmable controller according to the present invention that executes a plurality of sequence programs in parallel will first be described with reference to FIGS. 6 to 11.

The programmable controller of this embodiment comprises a plurality of sets of hardware each including a plurality of MPUs, a plurality of arithmetic-logic units, and arbitration circuits as many as the MPUs. Alternatively, the programmable controller of this embodiment comprises a plurality of sets of hardware each including a single MPU, a plurality of arithmetic-logic units, and a single arbitration circuit. The arbitration circuit is a circuit for executing an arbitration between the arithmetic-logic units when requesting the MPUs to execute instructions (MPU execution instructions) that cannot be executed by the arithmetic-logic units.

A single MPU, such as a multi-core MPU, including a plurality of cores for each chip may be used in place of the plurality of MPUs.

Figure 3:
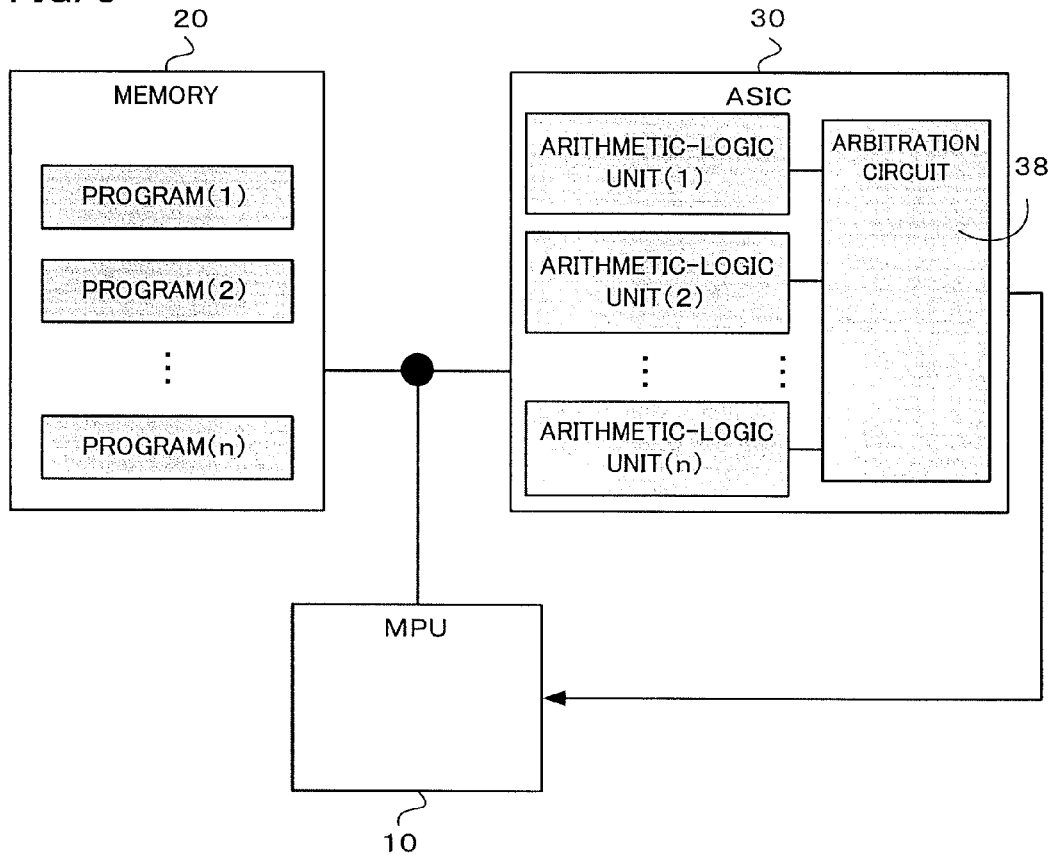
FIG. 3 is a schematic block diagram illustrating an example of a prior art programmable controller mounted with hardware comprising a single MPU and an ASIC including a plurality of arithmetic-logic units and a single arbitration circuit.
Figure 4:
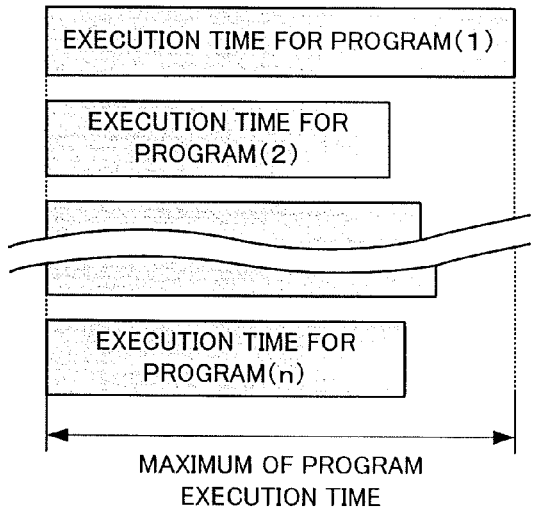
FIG. 4 is a diagram illustrating the time required to finish parallel execution of all of a plurality of programs by the programmable controller of FIG. 3.
Figure 5:
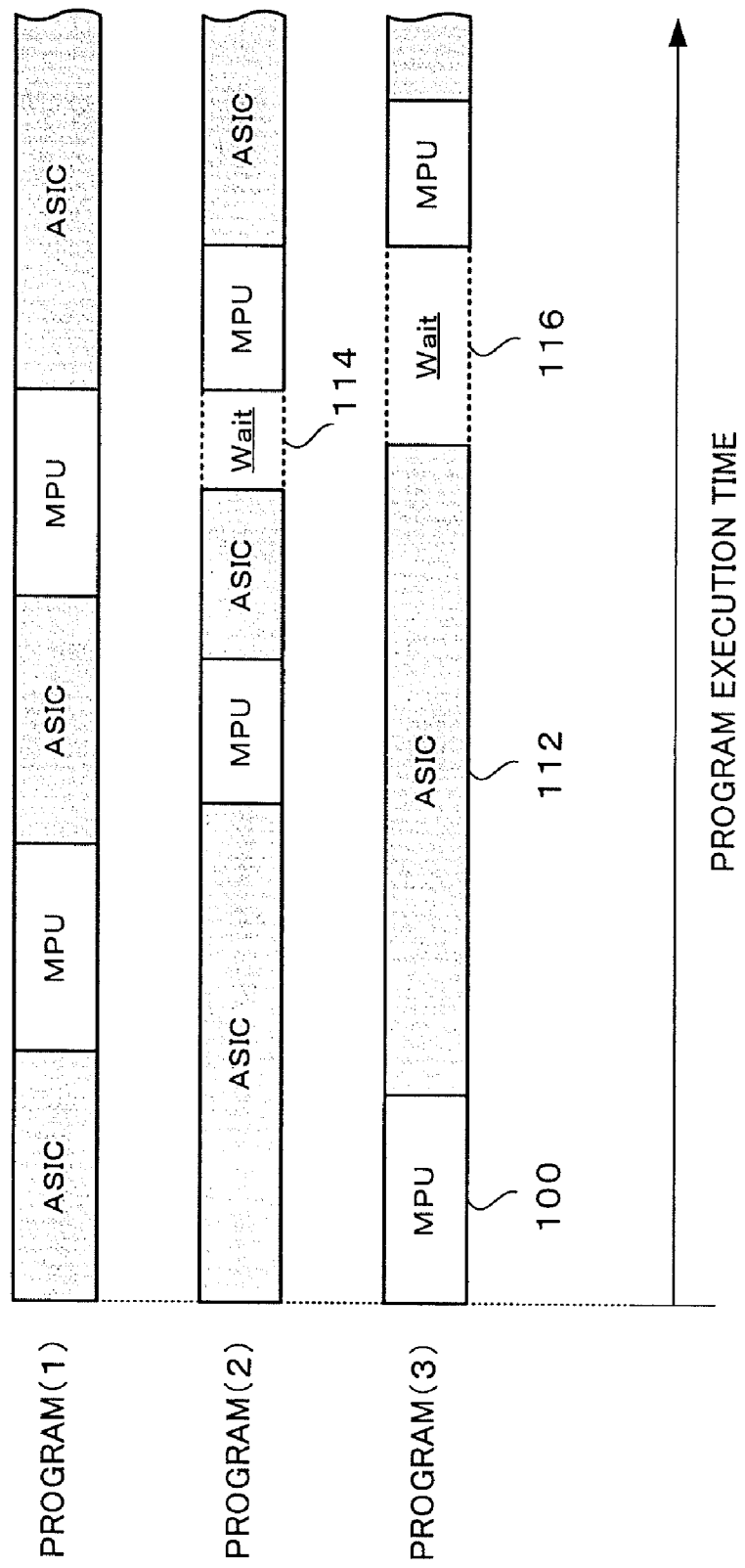
FIG. 5 is a diagram illustrating a problem caused when the plurality of programs are executed in parallel by the programmable controller of FIG. 3.

Thus, the programmable controller of this embodiment is equivalent to a combination of a plurality of sets of or a single or two or more memories 20 and hardware, comprising a single MPU 10 and a single ASIC 30 (including a plurality of arithmetic-logic units and a single arbitration circuit 38), such as the one shown in FIG. 3 (prior art), connected to the memories.

Figure 6:
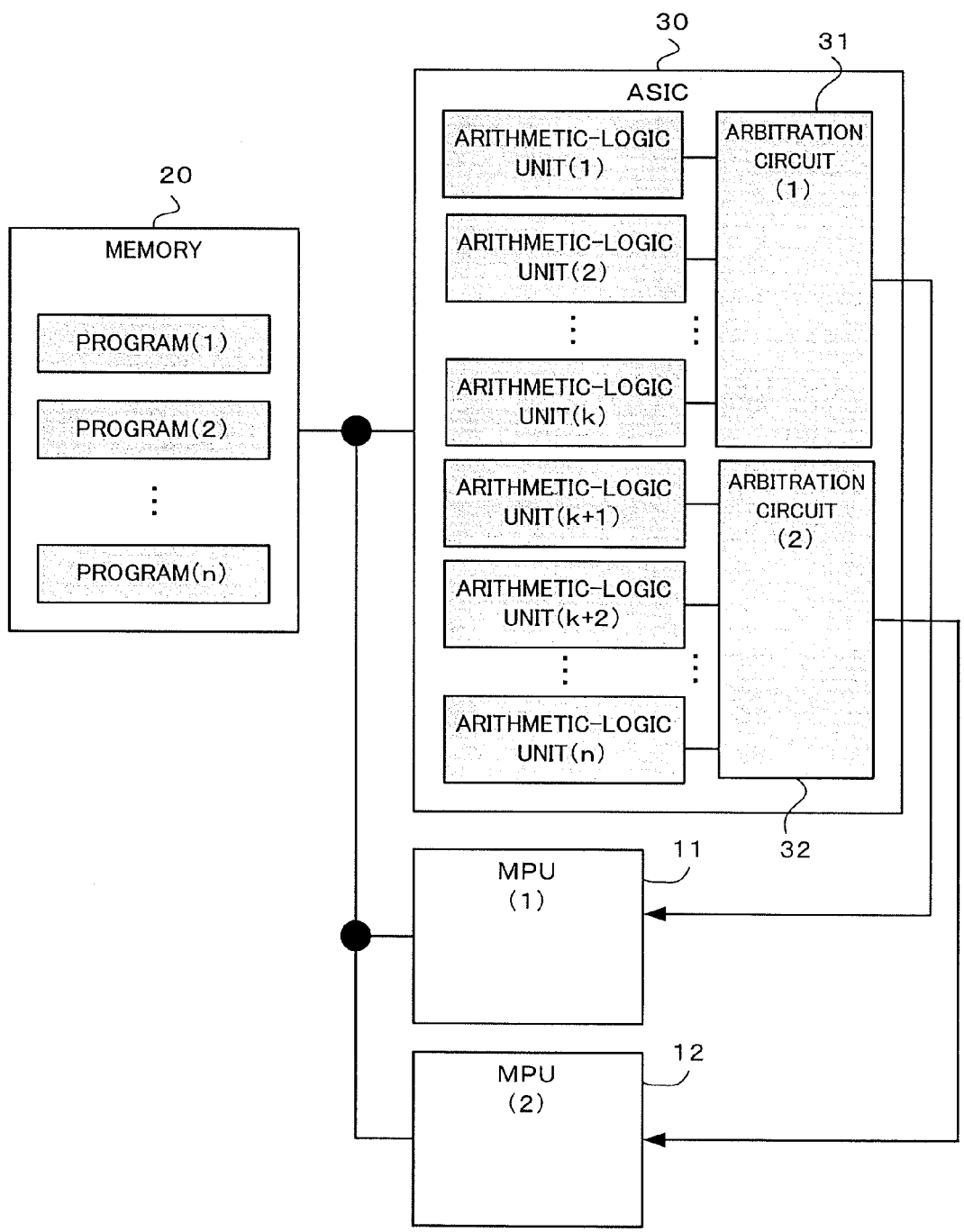
FIG. 6 is a schematic block diagram showing a first embodiment of a programmable controller according to the present invention, mounted with hardware comprising two MPUs and an ASIC including n number of arithmetic-logic units and two arbitration circuits, one of which is connected with k (<n) number of arithmetic-logic units.

A programmable controller shown in FIG. 6 is an example mounted with hardware that comprises an ASIC 30 and two MPUs 11 and 12. The ASIC 30 comprises n number of arithmetic-logic units and two arbitration circuits 31 and 32. Thus, the programmable controller shown in FIG. 6 is equivalent to a combination of the memory 20 and two sets of hardware, each comprising the single MPU 10 and the single ASIC 30 shown in FIG. 3, connected to the memory 20.

In the first embodiment, a simulation is performed by software before the start of execution of each sequence program, and a plurality of sequence programs are allocated individually to a plurality of groups in advance so that the entire program execution time is the shortest. In this way, these sequence programs can be processed in the shortest time.

Since the number of programs to be executed in parallel or the percentage of the MPU execution instructions in each program vary, a plurality of MPUs, if any, may fail to be utilized to the maximum extent in some cases.

Figure 7:
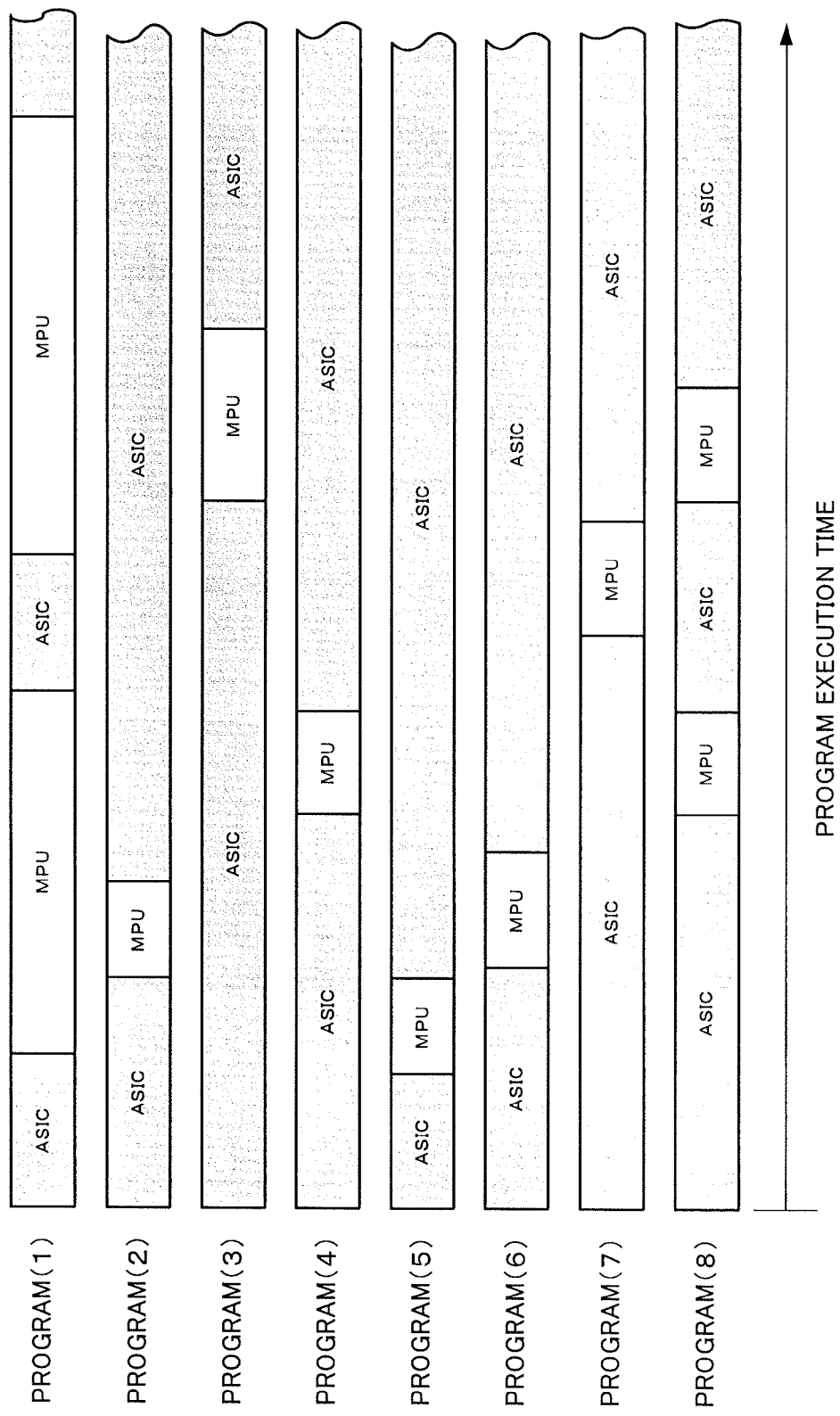
FIG. 7 is a diagram illustrating program execution times for the case where most of instructions that constitute one of eight programs executed in parallel are MPU execution instructions and most of instructions that constitute the remaining seven programs are ASIC execution instructions, during which each program is expected to be executed by its dedicated arithmetic-logic unit and MPU, that is, each program is not expected to compete with another program and be stopped to wait for the execution of the MPU instructions.

FIG. 7 is a diagram illustrating program execution times for the case where most of the instructions that constitute the program (1) are MPU execution instructions and most of the instructions that constitute the programs (2) to (8) are ASIC execution instructions. During the illustrated program execution times, each program is expected to be executed by its dedicated arithmetic-logic unit and MPU, that is, each program is not expected to compete with another program and be stopped to wait for the execution of the MPU instructions.

Figure 8:
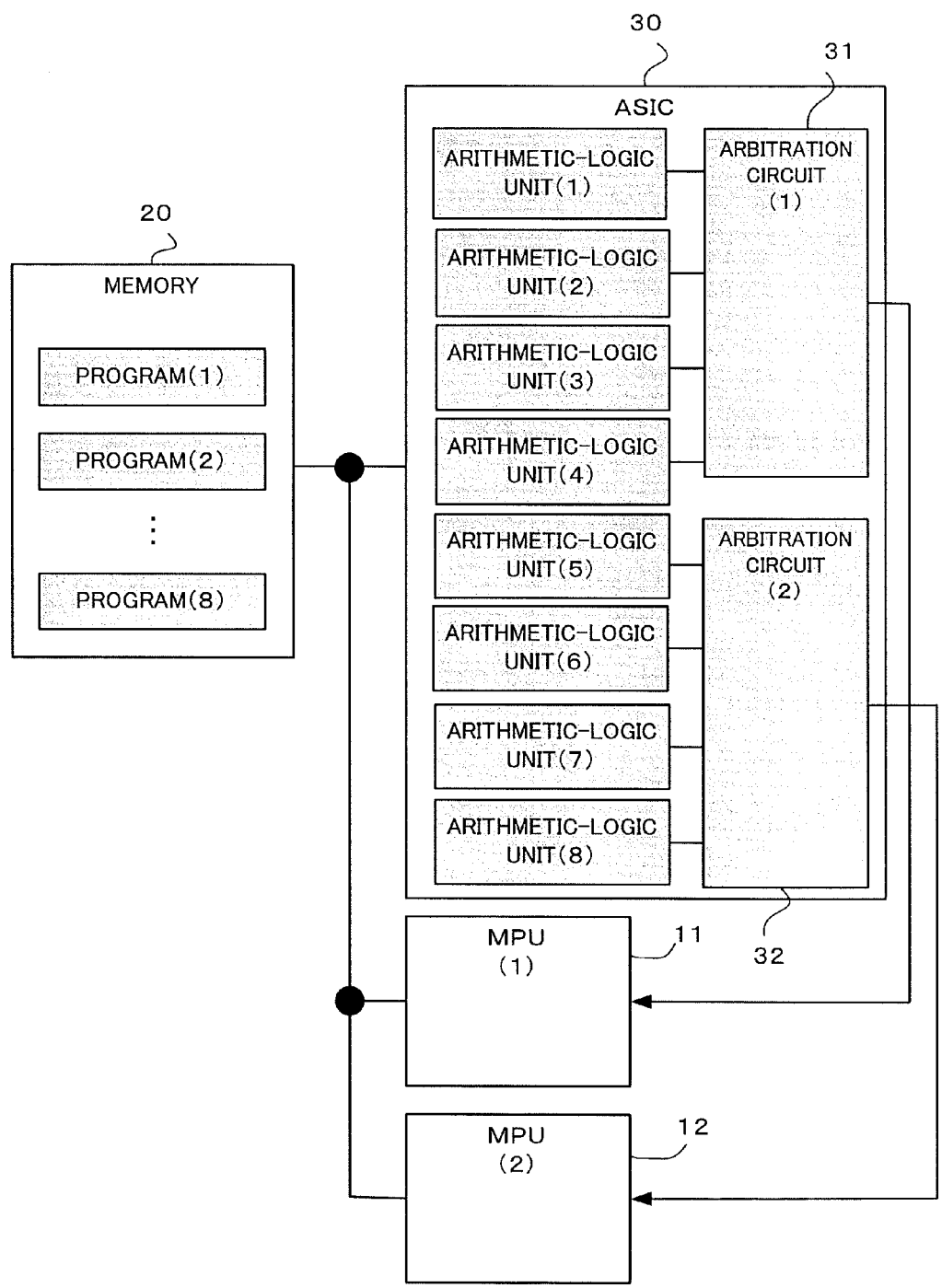
FIG. 8 is a schematic block diagram showing an example in which n (number of arithmetic-logic units included in the ASIC)=8 and k (number of arithmetic-logic units connected to the one arbitration circuit)=4 are given for the programmable controller of FIG. 6.

A programmable controller shown in FIG. 8 is an example in which n (number of arithmetic-logic units included in the ASIC 30)=8 and k (number of arithmetic-logic units connected to the arbitration circuit 31)=4 are given for the programmable controller shown in FIG. 6.

In this programmable controller, the ASIC 30 comprises eight arithmetic-logic units (1) to (8) and two arbitration circuits 31 and 32. The arithmetic-logic units (1) to (4) are connected to the first arbitration circuit 31, and the arithmetic-logic units (5) to (8) to the second arbitration circuit 32. Further, first and second arbitration circuits 31 and 32 are connected to first and second MPUs 11 and 12, respectively.

Thus, the programmable controller shown in FIG. 8 is equivalent to a combination of the memory 20 and two sets of hardware, each comprising the ASIC 30 (four (=n) arithmetic-logic units and a single arbitration circuit) and a single MPU shown in FIG. 3 (prior art), connected to the memory 20.

Figure 9:
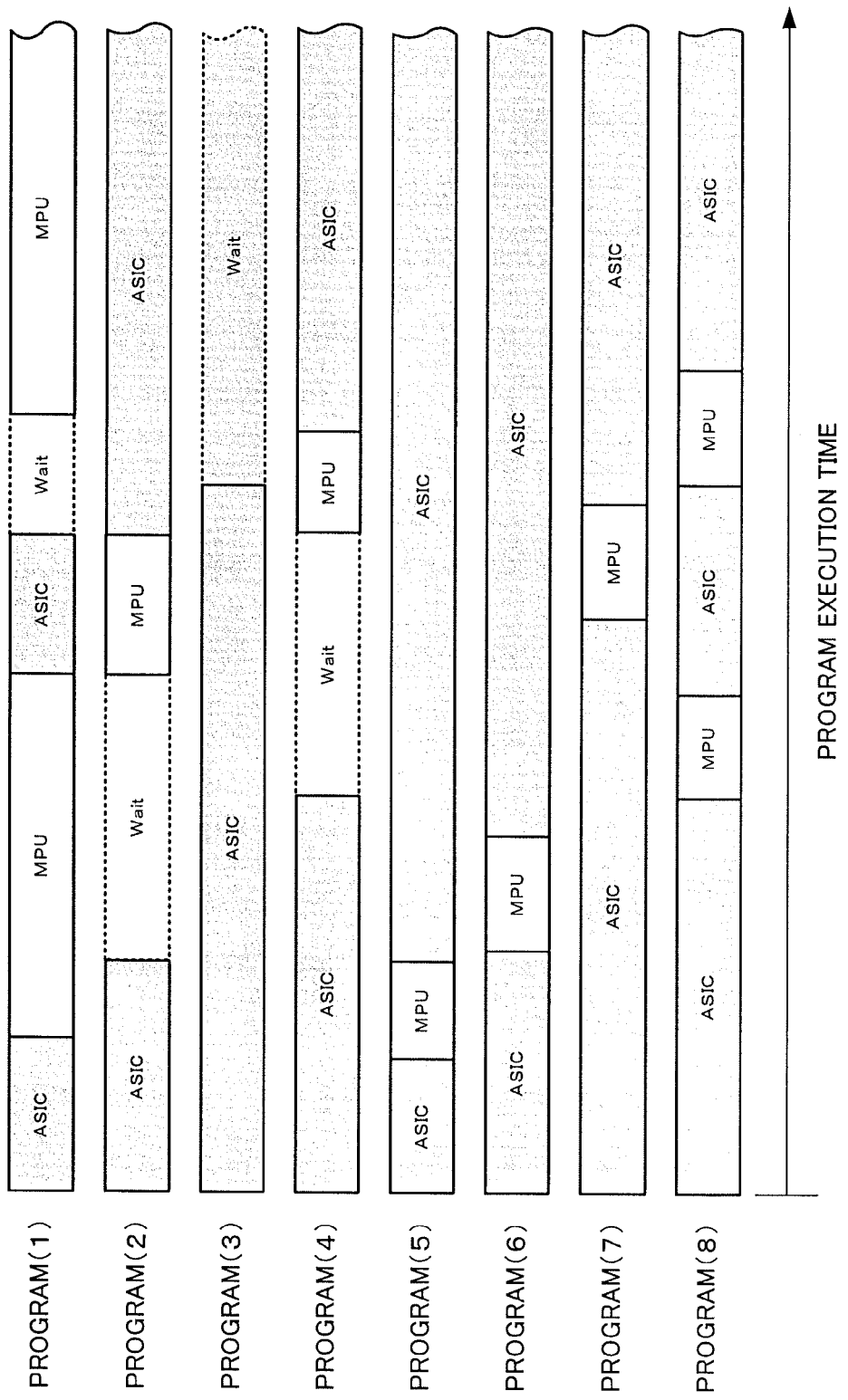
FIG. 9 is a diagram illustrating program execution times for the case where the programs of FIG. 7 are executed by the programmable controller with the configuration shown in FIG. 8.

FIG. 9 is a diagram illustrating program execution times for the case where the programs of FIG. 7 are executed by the programmable controller with the configuration shown in FIG. 8. Since the first MPU 11 is queued for MPU instruction execution in execution processing of program (1) to (4), the programs are stopped.

In order to avoid the problem of stop times shown in FIG. 9, therefore, the combination of the arbitration circuit and the arithmetic-logic units is changed.

Figure 10:
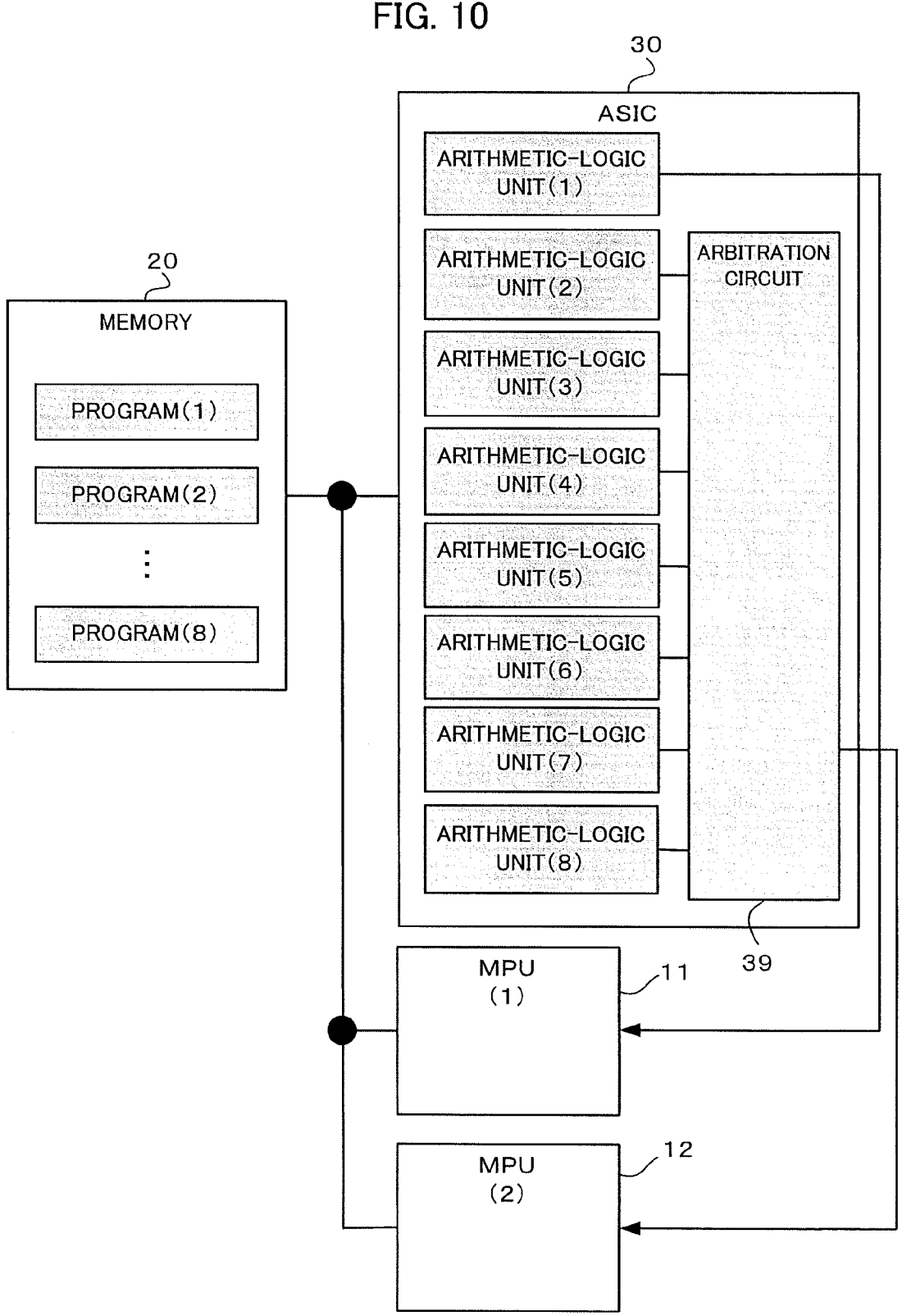
FIG. 10 is a schematic block diagram showing an example of a programmable controller mounted with hardware comprising two MPUs and an ASIC including eight arithmetic-logic units and a single arbitration circuit, seven of the eight arithmetic-logic units being connected to the arbitration circuit and the remaining one connected directly to one of the MPUs.

FIG. 10 shows an example of a programmable controller mounted with hardware that comprises an ASIC, including eight arithmetic-logic units and a single arbitration circuit 39, and two MPUs 11 and 12. Of the eight arithmetic-logic units, one arithmetic-logic unit (1) is connected directly to the first MPU 11, while the remaining seven arithmetic-logic units (2) to (8) are connected to the arbitration circuit 39. The arbitration circuit 39 is connected to the second MPU 12. Thus, in this case, the arbitration circuits and the MPUs are not equal in number.

Figure 11:
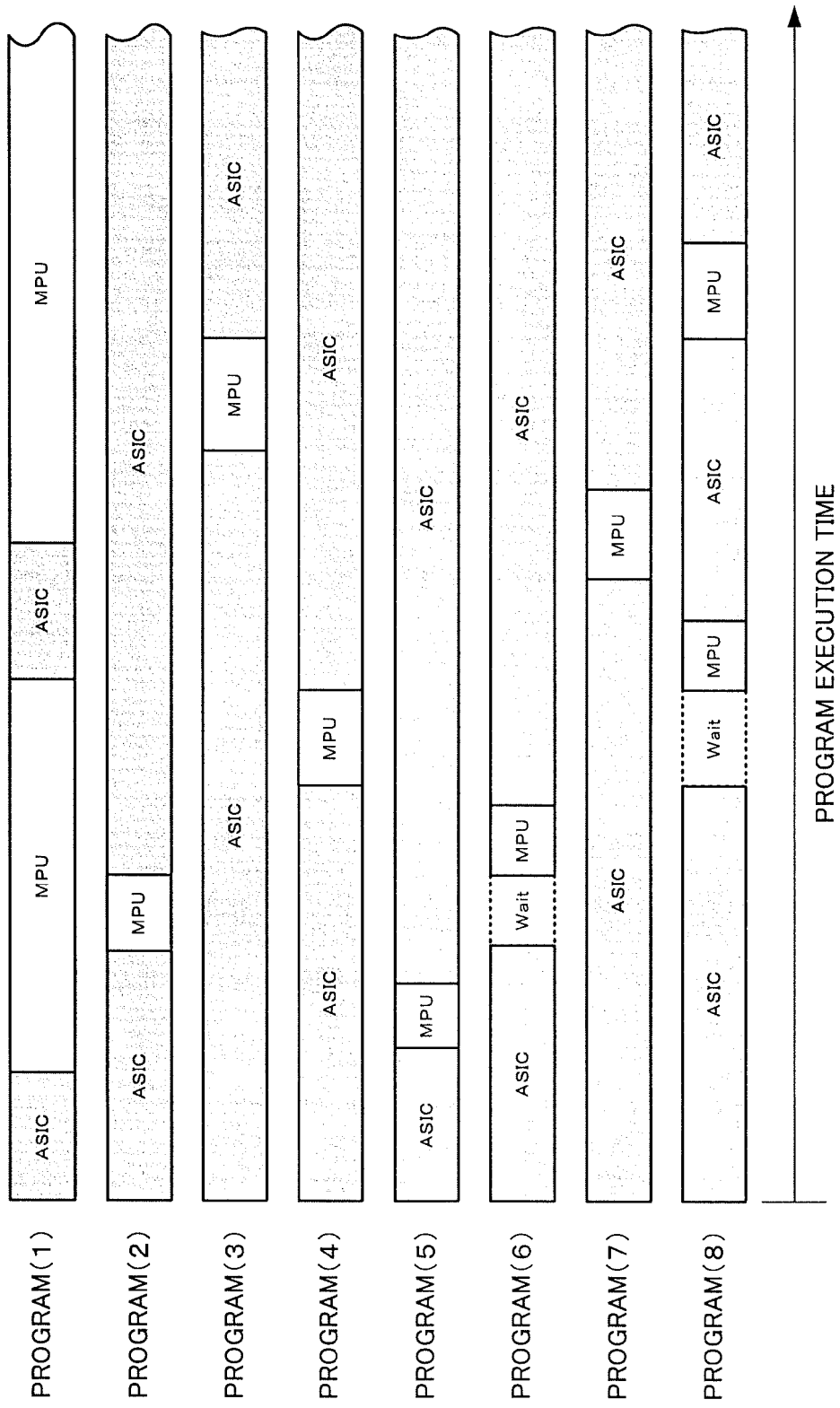
FIG. 11 is a diagram illustrating program execution times for the case where the programs of FIG. 7 are executed by the programmable controller with the configuration shown in FIG. 10.

FIG. 11 is a diagram illustrating program execution times for the case where the programs of FIG. 7 are executed by the programmable controller with the configuration shown in FIG. 10. If most of instructions that constitute a program (1) are MPU execution instructions and if most of instructions that constitute programs (2) to (8) are ASIC execution instructions, the entire execution time can be made shorter for the programmable controller with the hardware configuration of FIG. 10 than for the one with the hardware configuration of FIG. 8.

A second embodiment of the programmable controller according to the present invention that executes a plurality of sequence programs in parallel will then be described with reference to FIGS. 12 to 18.

Since the ratios of MPU execution instructions and ASIC execution instructions vary between programs, according to this embodiment, combinations of a plurality of MPUs and arithmetic-logic units can be changed according to the programs to be executed.

Figure 12:
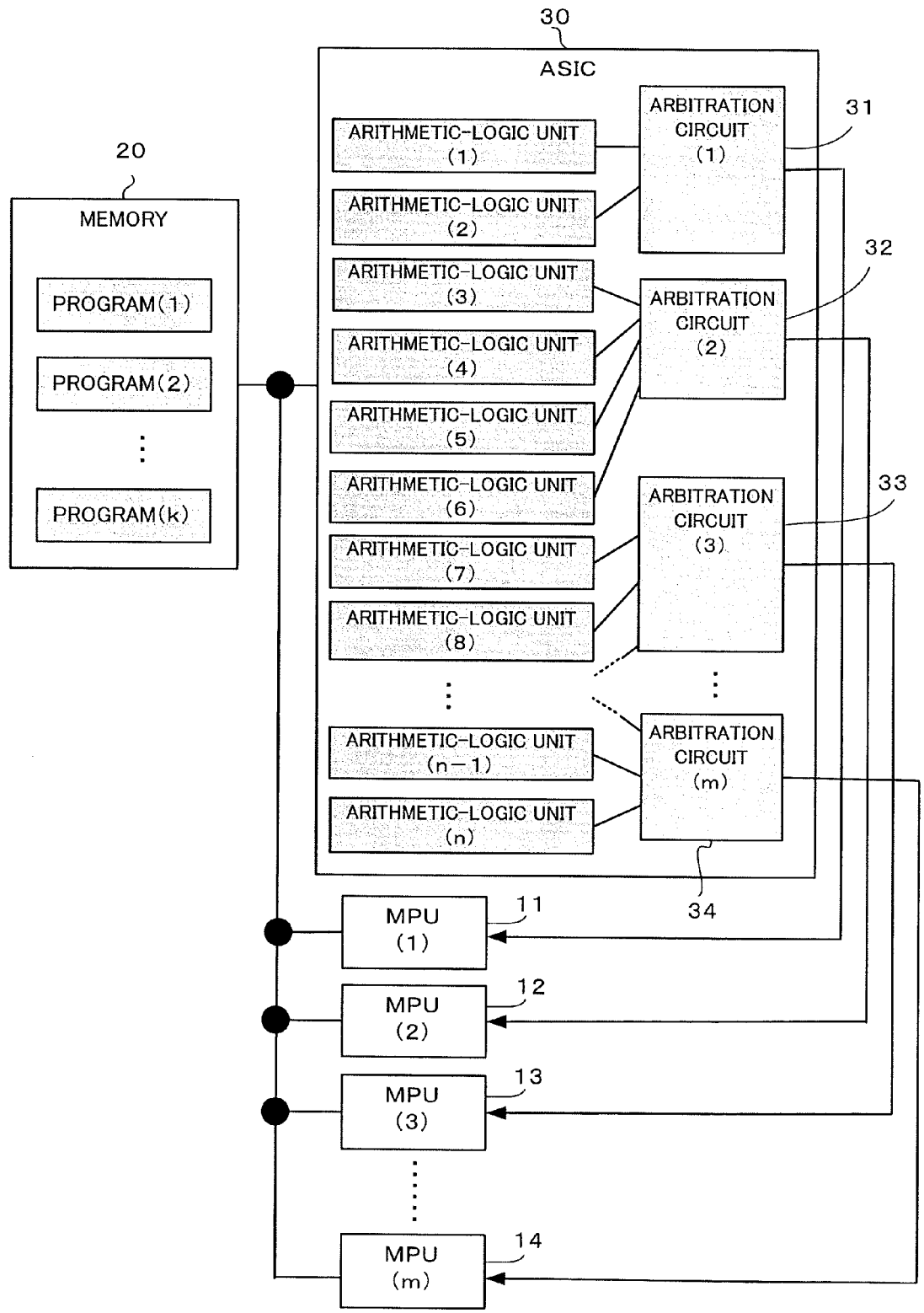
FIG. 12 is a schematic block diagram showing a second embodiment of the programmable controller according to the present invention, mounted with hardware comprising m number of MPUs and an ASIC including n number of arithmetic-logic units and m number of arbitration circuits and configured so that the number of arithmetic-logic units that are arbitrated by each arbitration circuit can be changed.

FIG. 12 shows a conventional example of a programmable controller configured so that the number of arithmetic-logic units that are arbitrated by each of arbitration circuits as many as m number of MPUs can be changed. According to this programmable controller, an optimum hardware configuration can be selected based on the contents of the programs to be executed in parallel.

Figure 13:
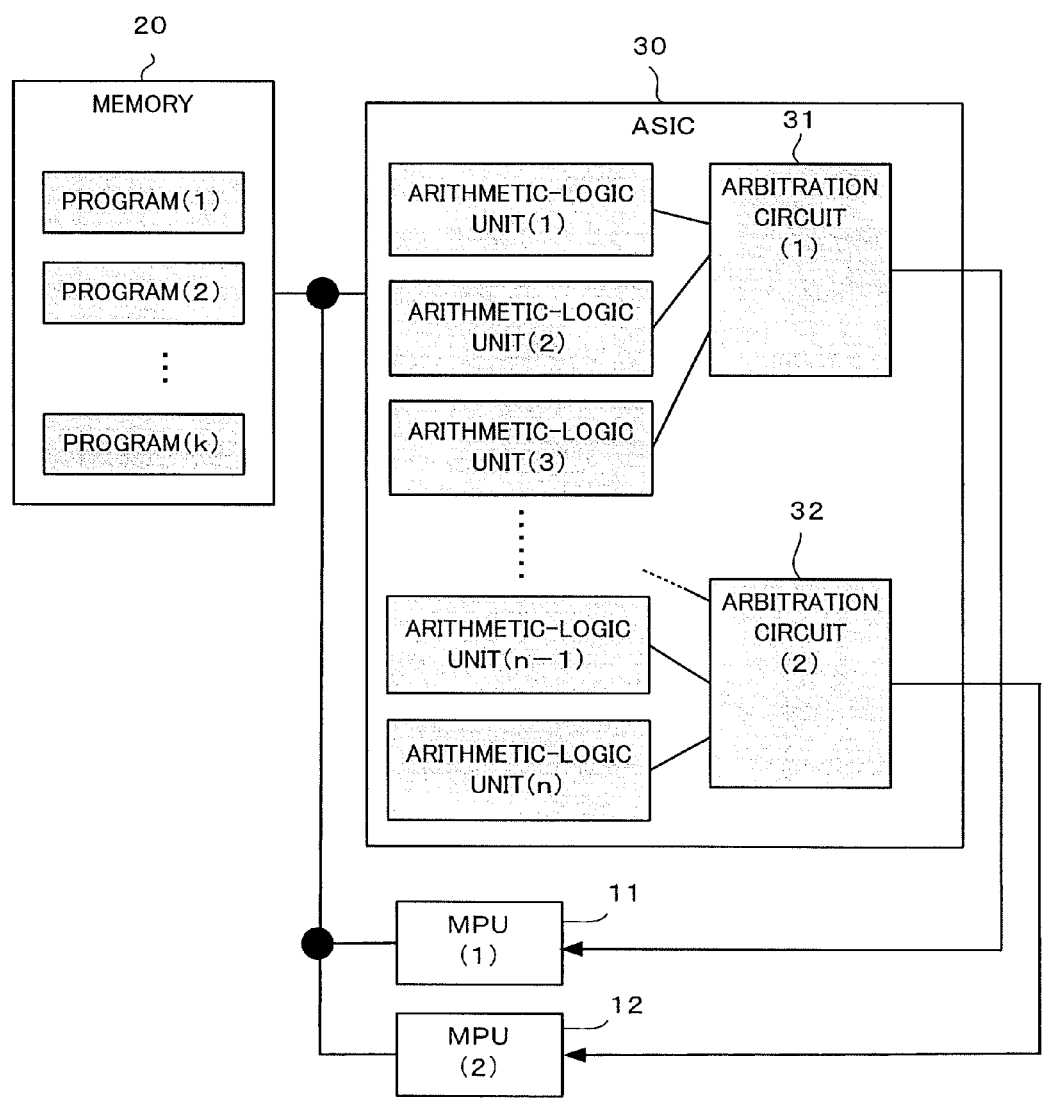
FIG. 13 is a schematic block diagram showing an example in which m (number of MPUs and arbitration circuits included in the ASIC)=2 is given for the programmable controller of FIG. 12.

FIG. 13 shows a conventional example of a programmable controller that comprises two MPUs, two arbitration circuits as many as the MPUs, and n number of arithmetic-logic units (n is an even number). According to this programmable controller, the n number of arithmetic-logic units are divided into two groups, a group connected to one arbitration circuit (arbitration circuit (1)) and a group connected to the other arbitration circuit (arbitration circuit (2)). This grouping is performed by the following n/2 number of methods:

[1]
MPU (1), arbitration circuit (1), and arithmetic-logic unit (1) are connected;
MPU (2), arbitration circuit (2), and arithmetic-logic units (2) to (n) are connected;

[2]
MPU (1), arbitration circuit (1), and arithmetic-logic units (1) and (2) are connected;
MPU (2), arbitration circuit (2), and arithmetic-logic units (3) to (n) are connected;

[3]
MPU (1), arbitration circuit (1), and arithmetic-logic units (1) to (3) are connected;
MPU (2), arbitration circuit (2), and arithmetic-logic units (4) to (n) are connected;

.
.

[n/2]
MPU (1), arbitration circuit (1), and arithmetic-logic units (1) to (n/2) are connected;
MPU (2), arbitration circuit (2), and arithmetic-logic units (n/2+1) to (n) are connected.

Figure 14:
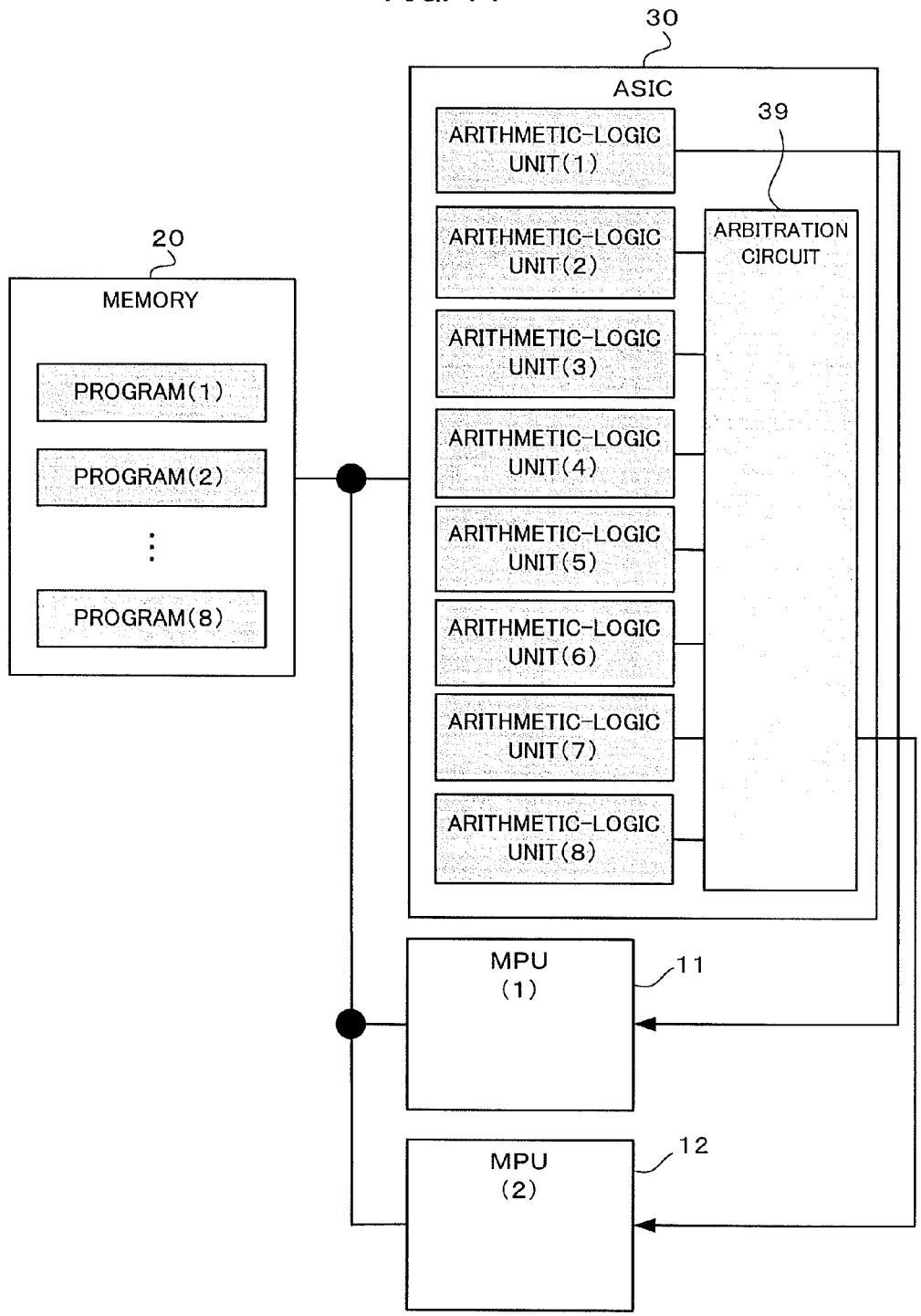
FIG. 14 is a diagram illustrating a first configuration example of the programmable controller of FIG. 13 with n (number of arithmetic-logic units included in the ASIC)=8 and a single arbitration circuit.
Figure 15:
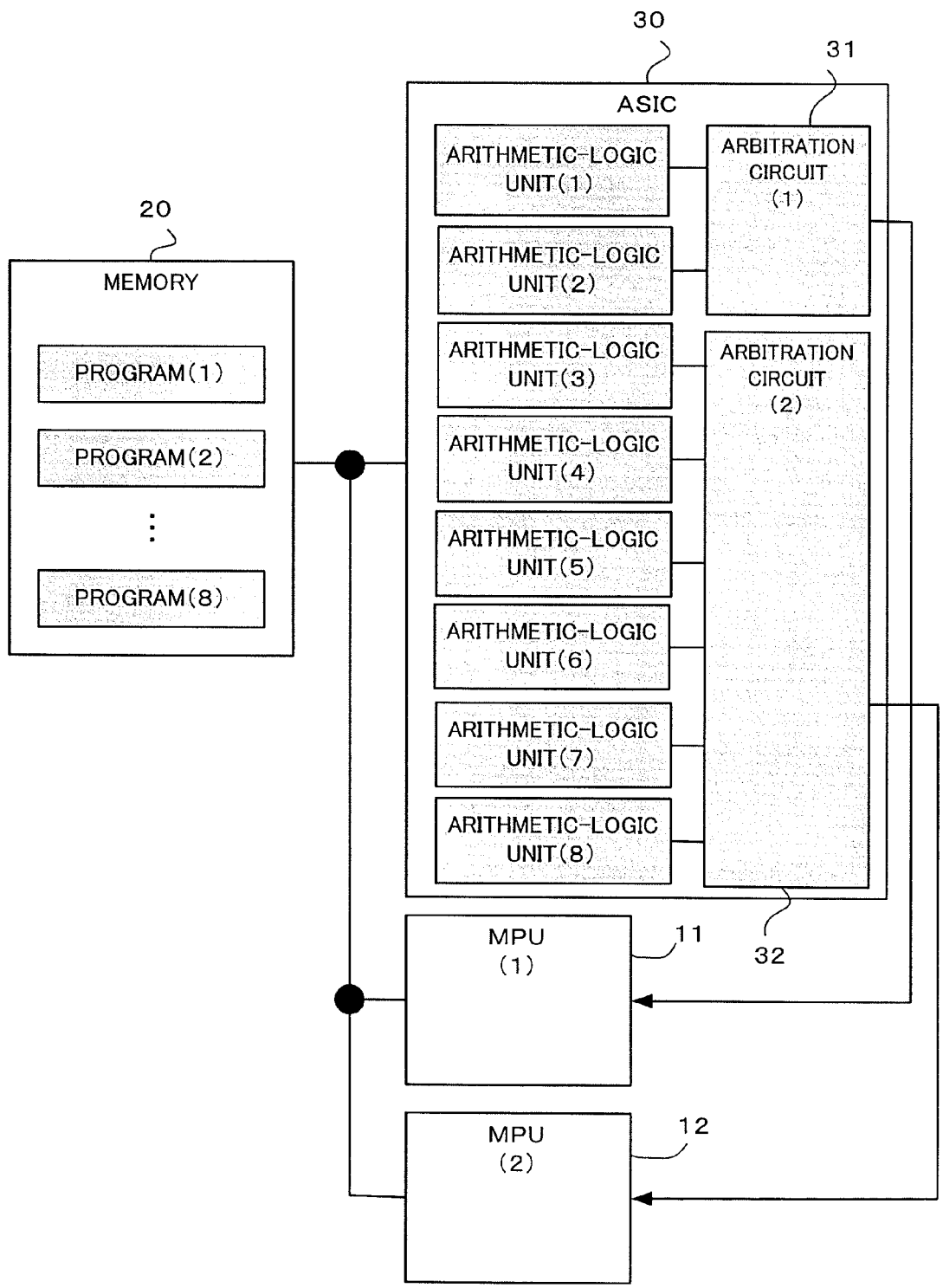
FIG. 15 is a diagram illustrating a second configuration example of the programmable controller of FIG. 13 with n (number of arithmetic-logic units included in the ASIC)=8, two of the arithmetic-logic units being connected to one of the arbitration circuits.
Figure 16:
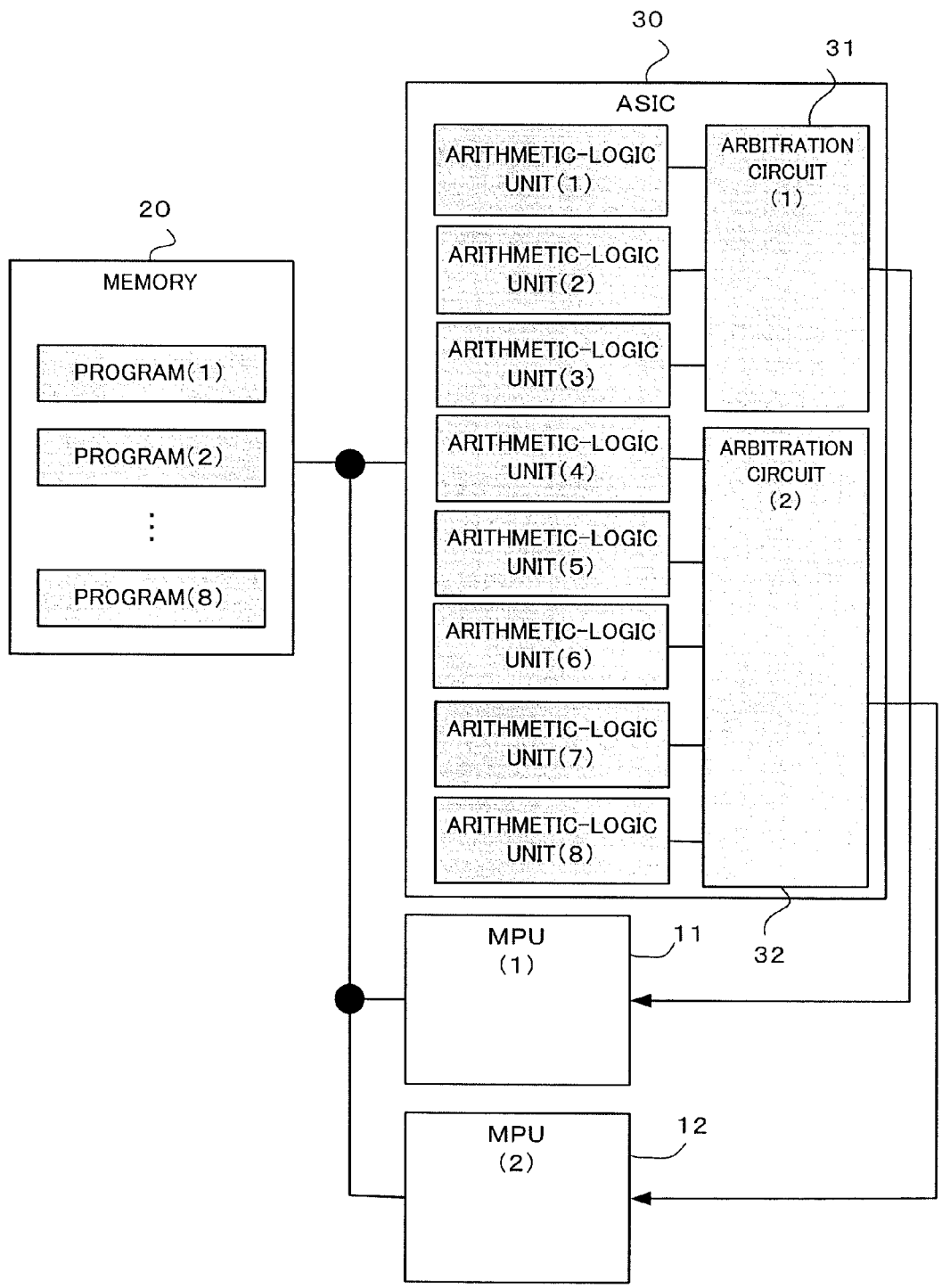
FIG. 16 is a diagram illustrating a third configuration example of the programmable controller of FIG. 13 with n (number of arithmetic-logic units included in the ASIC)=8, three of the arithmetic-logic units being connected to one of the arbitration circuits.
Figure 17:
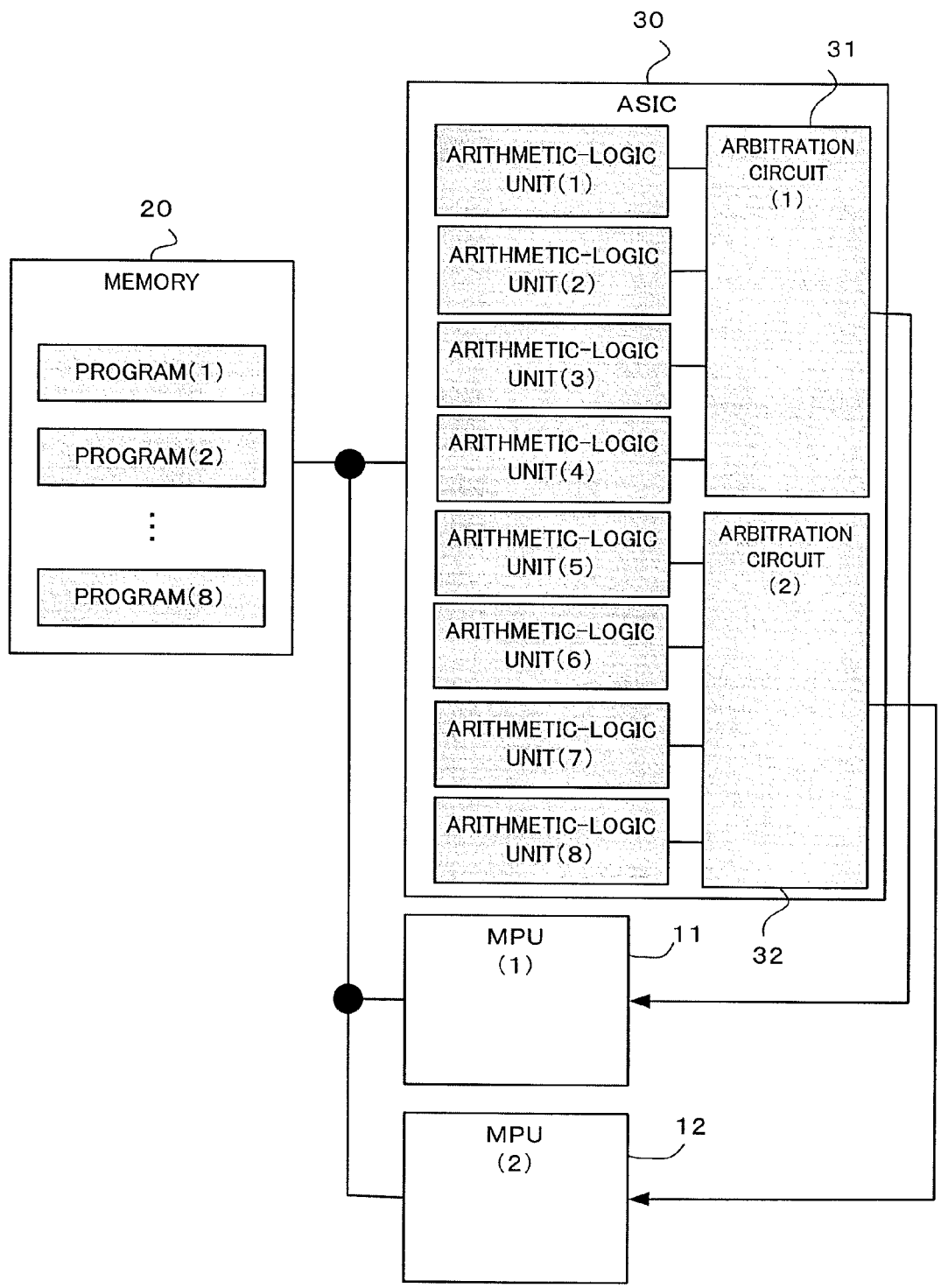
FIG. 17 is a diagram illustrating a fourth configuration example of the programmable controller of FIG. 13 with n (number of arithmetic-logic units included in the ASIC)=8, four of the arithmetic-logic units being connected to one of the arbitration circuits.

FIGS. 14 (first configuration), 15 (second configuration), 16 (third configuration) and 17 (fourth configuration) show examples in which n (number of arithmetic-logic units)=8 is given for the programmable controller of FIG. 13 (comprising the two MPUs and n number of arithmetic-logic units).

If n (number of arithmetic-logic units)=8 is given for the programmable controller of FIG. 13, the combination of two MPUs and eight arithmetic-logic units can be changed according to the programs, as shown in FIGS. 14 to 17 (first to fourth configurations), by means of register setting of a hardware configuration comprising those arithmetic-logic units and MPUs. Such hardware configuration as can be changed will be described later with reference to FIG. 18.

A simulation is performed using software to determine how to set the hardware configuration, that is, to combine the two MPUs and the eight arithmetic-logic units (grouping of the eight arithmetic-logic units), before the start of execution of each sequence program. A plurality of programs are executed based on combinations of all hardware configurations, and a combination that results in the shortest entire program execution time is adopted.

Thus, the time during which the execution of the programs is stopped to wait for the execution of the MPU execution instructions can be shortened by constructing a plurality of sets of hardware, each comprising a plurality of arithmetic-logic units, one or more arbitration circuits, and a plurality of MPUs, while a plurality of independent sequence programs are being executed, and then changing (or recombining) the hardware configurations of the programmable controller in accordance with the contents of the sequence program.

Figure 18:
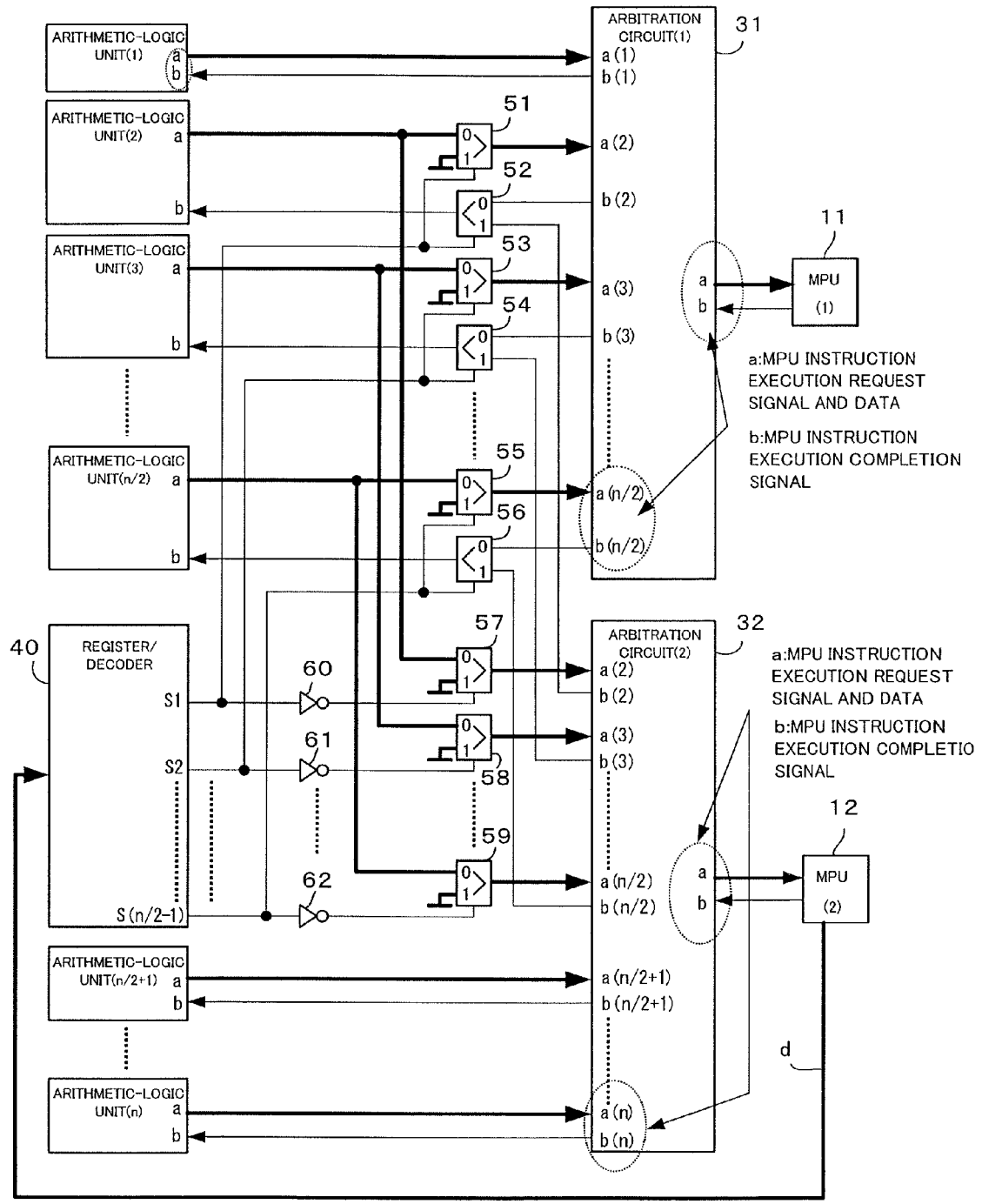
FIG. 18 is a diagram illustrating an example of a hardware configuration of the programmable controller of FIG. 13, in which n number of arithmetic-logic units can be suitably divided into two groups, a group connected to one of two arbitration circuits and a group connected to the other arbitration circuit.

FIG. 18 shows register setting of hardware comprising two MPUs and n number of arithmetic-logic units in the programmable controller of FIG. 13, in which combinations of the MPUs and arithmetic-logic units can be changed in the manner shown in FIGS. 14 to 17.

The memory 20 is omitted in FIG. 18. The first and second MPUs 11 and 12 are connected to the arbitration circuits 31 and 32, respectively.

The first arbitration circuit 31 can execute arbitration between the arithmetic-logic units (1) to (n/2), and outputs MPU instruction execution request signals generated in any of the arithmetic-logic units to the first MPU 11 in the order of generation. If the execution of instructions is completed, moreover, the first MPU 11 outputs an MPU instruction execution completion signal to the first arbitration circuit 31. The first arbitration circuit 31 outputs the MPU instruction execution completion signal to the arithmetic-logic unit that has output an MPU instruction execution request signal.

The second arbitration circuit 32 can execute arbitration between the arithmetic-logic units (2) to (n), and outputs MPU instruction execution request signals generated in any of the arithmetic-logic units to the second MPU 12 in the order of generation.

Thus, the arithmetic-logic units (1) to (n/2) can be connected to either of the first and second arbitration circuits 31 and 32. Specifically, the arithmetic-logic units (1) to (n/2) and the first and second arbitration circuits 31 and 32 are connected through selectors 51 to 59, as shown in FIG. 18, and MPU instruction execution request signals and data output by the arithmetic-logic units (1) to (n/2) are output to either the first or second arbitration circuit 31 or 32 by setting the selectors 51 to 59. The MPU instruction execution request signals and data are output from the first or second arbitration circuit 31 or 32 to the first or second MPU 11 or 12. In FIG. 18, reference numerals 51 to 59 are not assumed to imply nine selectors but refer to only those selectors which are shown without being omitted in FIG. 18.

On the other hand, the MPU instruction execution completion signal output from the first or second MPU 11 or 12 is output to the arithmetic-logic unit, having output the MPU instruction execution request signal, from the first or second arbitration circuit 31 or 32 directly or through the selectors 51 to 59. The arithmetic-logic unit (1) and the first arbitration circuit 31 are connected directly to each other without the aid of the selectors.

Signals output from terminals S1, S2, S(n/2−1) of a register/decoder 40 are 0 or 1 outputs, and the selectors 51 to 59 are switched in accordance with the output values. The selectors are switched in response to a command from the register/decoder 40. The way of setting the selectors 51 to 59 is given, as selector setting information d, from the second MPU 12 to the register/decoder 40. Alternatively, the selector setting information may be given from the first MPU 11 to the register/decoder 40.

The selectors 51, 52 and 57 will be described by way of example. An output from an a-terminal of the arithmetic-logic unit (2) is input to respective 0-terminals of the selectors 51 and 57. Respective 1-terminals of the selectors 51 and 57 are grounded, and the output of the selector 51 is input to a terminal a(2) of the first arbitration circuit 31. The output of the selector 57 is input to a terminal a(2) of the second arbitration circuit 32.

Outputs from respective terminals b(2) of the first and second arbitration circuits 31 and 32 are input to 0- and 1-terminals of the selector 52, respectively. The output of the selector 52 is input to a b-terminal of the arithmetic-logic unit (2).

Likewise, the arithmetic-logic units (3) to (n/2) are connected to the first and second arbitration circuits 31 and 32 through the selectors 53, 54, 55, 56, 58 and 59.

An output from the terminal S1 of the register/decoder 40 is input to respective switching terminals of the selectors 51 and 52, while it is input to a switching terminal of the selector 57 through an inverter 60. If a signal indicative of "1" is output from the terminal S1 of the register/decoder 40, for example, a switch of the selector 51 is connected to "1". If a signal indicative of "0" is output from the terminal S1, the switch of the selector 51 is connected to "0".

As described above, the MPU instruction execution request signal and data are output from the a-terminal of each of the arithmetic-logic units (1) to (n) directly or through the selectors 51 to 59. In FIG. 18, the arithmetic-logic unit (1) is connected directly to the first arbitration circuit 31, and the arithmetic-logic units (n/2+1) to (n) are connected to the second arbitration circuit 32.

Further, the MPU instruction execution completion signal is delivered from the first or second arbitration circuit 31 or 32 to each arithmetic-logic unit directly or through the selectors 51 to 59.

Selection signals of the selectors 51 to 59 are generated by the register/decoder 40. Table 1 shows selection signals S(n/2−1), . . . , S3, S2 and S1 for determining the arbitration circuit, whether the first or second arbitration circuit 31 or 32, to which (n/2−1) number of arithmetic-logic units are to be connected.

TABLE 1

| Selection signals | | | | |
|---|---|---|---|---|
| S(n/2 − 1), | ..., | S3, | S2, | S1 |
| 0, | ..., | 0, | 0, | 0 |
| 0, | ..., | 0, | 0, | 1 |
| 0, | ..., | 0, | 1, | 1 |
| 0, | ..., | 1, | 1, | 1 |
| . | | | | |
| . | | | | |
| . | | | | |
| 1, | ..., | 1, | 1, | 1 |

If (S(n/2−1), . . . , S3, S2, S1)=(1, . . . , 1, 1, 1) is given, only the arithmetic-logic unit (1) outputs the data and the MPU instruction execution request signal to the first MPU 11. In this case, the data, MPU instruction execution request signal, and MPU instruction execution completion signal are transferred directly between the first arithmetic-logic unit and the first MPU 11 without the aid of the arbitration circuit.

Further, the register/decoder 40 is set to be a circuit that generates the selection signals shown in Table 1 based on set values of the register. The register of the register/decoder 40 is configured to be settable by an MPU. If the arithmetic-logic units are, for example, eight in number, two-bit registers R1 and R0 are provided so that the selection signals S1, S2 and S3 shown in Table 2 can be generated by decoding data from the registers.

TABLE 2

| Two-bit registers | | Selection signals | | |
|---|---|---|---|---|
| R1, | R0 | S3, | S2, | S1 |
| 0, | 0 | 0, | 0, | 0 |
| 0, | 1 | 0, | 0, | 1 |
| 1, | 0 | 0, | 1, | 1 |
| 1, | 1 | 1, | 1, | 1 |

According to the embodiment of the present invention described above, the invention relates to hardware configured so that a plurality of independent sequence programs are executed in parallel by a structure comprising a plurality of arithmetic-logic units and MPUs. An optimum configuration for the shortest program processing time can be selected from combinations of hardware connections of a plurality of arithmetic-logic units and MPUs, based on the number of sequence programs and the contents of instructions that constitute each sequence program.

The invention claimed is:

1. A programmable controller which executes a plurality of independent sequence programs in parallel, the programmable controller comprising:
a plurality of arithmetic-logic units configured to execute predetermined first instructions in the sequence programs by hardware;
a plurality of MPUs configured to execute second instructions in the independent sequence programs, from among the plurality of independent sequence programs executed in parallel, which can not be executed by the arithmetic-logic units;
first transfer means configured to transfer information associated with at least one of the second instructions generated in the arithmetic-logic units to the MPUs in the order of execution of the instructions; and
second transfer means configured to transfer information associated with results of execution of the second instructions executed by the MPUs to the arithmetic-logic units which are sources of generation of the information associated with the second instructions, wherein
the plurality of arithmetic-logic units are divided into groups as many as the MPUs, each of the groups including at least one arithmetic-logic unit;
at least one of the groups includes at least two arithmetic-logic units, and the first and second transfer means and the MPUs are arranged in association with a group including the at least two arithmetic-logic units; and
said programmable controller further comprises selection means for selecting, when grouping the arithmetic-logic units into a plurality of groups, respective groups to which individual arithmetic-logic unit is caused to belong.

2. The programmable controller according to claim 1, wherein the selection means includes a register configured to store data which specifies the group to which each of the arithmetic-logic units is caused to belong, and a selection circuit which associates each of the arithmetic-logic units with the first and second transfer means and the MPU corresponding to the group to which the arithmetic-logic unit belongs in accordance with the data stored in the register.

3. The programmable controller according to claim 2, wherein the data which specifies the group to which each of the arithmetic-logic units belongs is data on a combination for the shortest execution time for the plurality of individual sequence programs, based on a simulation performed by arbitrarily dividing the sequence programs into the groups.

4. The programmable controller according to claim 1, wherein said programmable controller further comprises third transfer means, in place of said first transfer means, which directly transfer information associated with said second instructions from one of the arithmetic-logic units to one of the MPUs.

5. The programmable controller according to claim 2, wherein said programmable controller further comprises third transfer means, in place of said first transfer means, which directly transfer information associated with said second instructions from one of the arithmetic-logic units to one of the MPUs.

6. The programmable controller according to claim 3, wherein said programmable controller further comprises third transfer means, in place of said first transfer means, which directly transfer information associated with said second instructions from one of the arithmetic-logic units to one of the MPUs.

* * * * *